(12) United States Patent
Rios et al.

(10) Patent No.: US 10,680,236 B2
(45) Date of Patent: Jun. 9, 2020

(54) HIGH CAPACITY MONOLITHIC COMPOSITE SI/CARBON FIBER ELECTRODE ARCHITECTURES SYNTHESIZED FROM LOW COST MATERIALS AND PROCESS TECHNOLOGIES

(71) Applicant: UT-BATTELLE, LLC, Oak Ridge, TN (US)

(72) Inventors: Orlando Rios, Knoxville, TN (US); Claus Daniel, Knoxville, TN (US); Wyatt Evan Tenhaeff, Rochester, NY (US); Surendra K. Martha, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 154 days.

(21) Appl. No.: 15/892,086

(22) Filed: Feb. 8, 2018

(65) Prior Publication Data
US 2018/0166684 A1 Jun. 14, 2018

Related U.S. Application Data

(60) Division of application No. 14/021,743, filed on Sep. 9, 2013, now Pat. No. 9,929,400, which is a continuation-in-part of application No. 13/567,275, filed on Aug. 6, 2012, now Pat. No. 9,359,695.

(51) Int. Cl.
| | |
|---|---|
| *H01M 4/36* | (2006.01) |
| *H01M 4/38* | (2006.01) |
| *H01M 4/134* | (2010.01) |
| *H01M 4/587* | (2010.01) |
| *H01M 4/133* | (2010.01) |
| *H01M 4/1393* | (2010.01) |
| *H01M 4/1395* | (2010.01) |

(52) U.S. Cl.
CPC .......... *H01M 4/362* (2013.01); *H01M 4/386* (2013.01); *H01M 4/587* (2013.01); *H01M 4/133* (2013.01); *H01M 4/134* (2013.01); *H01M 4/1393* (2013.01); *H01M 4/1395* (2013.01); *Y10T 428/2918* (2015.01)

(58) Field of Classification Search
CPC ...... H01M 4/362; H01M 4/386; H01M 4/587; H01M 4/133; H01M 4/134; H01M 4/1393; H01M 4/1395; Y10T 428/2918
See application file for complete search history.

(56) References Cited

U.S. PATENT DOCUMENTS

| | | | |
|---|---|---|---|
| 5,376,251 A | 12/1994 | Kaneko et al. | |
| 6,406,817 B2 | 6/2002 | Wariishi et al. | |
| 6,416,902 B1 | 7/2002 | Miyasaka | |
| 7,618,678 B2 | 11/2009 | Mao et al. | |
| 7,785,661 B2 | 8/2010 | Carel et al. | |
| 8,163,406 B2 | 4/2012 | Kanaoka et al. | |
| 2003/0100239 A1* | 5/2003 | Gaffney | C04B 35/83 442/354 |
| 2008/0287607 A1* | 11/2008 | Tai Chen | C08L 33/20 525/204 |
| 2009/0318280 A1* | 12/2009 | Mohammadi | C04B 35/563 501/87 |
| 2011/0111284 A1 | 5/2011 | Maeshima et al. | |
| 2011/0111294 A1* | 5/2011 | Lopez | H01M 4/134 429/217 |
| 2011/0281205 A1 | 11/2011 | Pak et al. | |
| 2011/0285049 A1* | 11/2011 | Baker | D01F 1/09 264/105 |
| 2012/0009344 A1 | 1/2012 | Ando et al. | |
| 2012/0052412 A1 | 3/2012 | Yamakawa et al. | |

FOREIGN PATENT DOCUMENTS

| | | |
|---|---|---|
| CN | 102509781 A | 6/2012 |
| CN | 102651476 A | 8/2012 |

OTHER PUBLICATIONS

Braun et al., "Lignin-based carbon fibers: Oxidative thermostabilization of Kraft lignin", Carbon (2005) 43: 385-394.
Fey et al., "Pyrolytic carbons from porogen-treated rice husk as lithium-insertion anode materials", International Journal of Chemical Engineering and Applications (2011) 2(1). (6 pages).
Kercher et al., "Carbon fiber paper cathodes for lithium ion batteries", J Electrochem Soc (2010): 157(12): A1323-A1327.
Ko et al., "Multifunctional composite nanofibers for smart structures", University of British Columbia (2011): FA2386-09-1-4067. (13 pages).
Snyder et al., "Evaluation of commercially available carbon fibers, fabrics, and papers for potential use in multifunctional energy storage applications", J Electrochem Soc (2009) 156(3): A215-A224.
Wang et al., "A novel carbon-silicon composite nanofiber prepared via electrospinning as anode material for high energy-density lithium ion batteries", Journal of Power Sources (2010) 195(15): 5052-5056.
Xiao et al., "The chemical modification of lignins with succinic anhydride in aqueous systems", Polymer Degradation and Stability (2001) 71: 223-231.
Yu et al, "Simple preparation of nanoporous Si/C composites with naphthalene for Li-ion batteries", Journal of Electrochemical Society (2012) Abstract # 914. (1 page).

\* cited by examiner

*Primary Examiner* — Muhammad S Siddiquee
(74) *Attorney, Agent, or Firm* — Fox Rothschild LLP

(57) ABSTRACT

A composite Si-carbon fiber comprising a carbon matrix material with 1-90 wt % silicon embedded therein. The composite carbon fibers are incorporated into electrodes for batteries. The battery can be a lithium ion battery. A method of making an electrode incorporating composite Si-carbon fibers is also disclosed.

26 Claims, 12 Drawing Sheets

HIGH CAPACITY MONOLITHIC COMPOSITE SI/CARBON FIBER ELECTRODE ARCHITECTURES SYNTHESIZED FROM LOW COST MATERIALS AND PROCESS TECHNOLOGIES

CROSS REFERENCE TO RELATED APPLICATIONS

This application is a divisional application of U.S. patent application Ser. No. 14/021,743 filed Sep. 9, 2013, which is a continuation-in-part of U.S. patent application Ser. No. 13/567,275, filed on Aug. 6, 2012 and issued as U.S. Pat. No. 9,359,695 on Jun. 7, 2016, the entireties of which are all hereby incorporated by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to batteries, and more particularly to electrodes for batteries.

BACKGROUND OF THE INVENTION

Silicon has been a sought after anode material for years due to its high capacity 3800 mAh/g in comparison to battery grade graphite 350 mAh/g. Silicon however does not cycle reversible due to the very significant volume expansion associated with intercalation and the lack of a stable solid electrolyte interface (SEI) layer.

Lignin is a waste product of the pulp-and-paper industry produced at a rate of millions of tons per year and is burned for calorific value. It is the principal noncarbohydrate constituent of wood that provides rigidity to the cell walls of plants. A sustainable, renewable resource, lignin is derived from woody plants such as trees and switchgrass.

SUMMARY OF THE INVENTION

A composite Si-carbon fiber comprising a carbon matrix material with 1-90 wt % silicon embedded therein. The composite Si-carbon fiber can comprise 1-30 wt % silicon embedded therein.

The composite Si-carbon fiber can have a diameter of 10-200 μm and a length of at least 3 times the diameter. The composite Si-carbon fiber can have a diameter of 50-100 μm and a length of at least 3 times the diameter.

The silicon can be crystalline with crystals of between 5 nm-200 μm in size. The silicon can be amorphous with particles of between 5 nm-200 μm in size.

The carbon matrix material can be derived from lignin. The carbon matrix material can be derived from an aromatic backbone polymer with a carbon char yield above 30 wt %. The carbon matrix material can be derived from polyacrylonitrile. The carbon matrix material can have a density of 2.0 g/cm³ or less. The carbon matrix material can have a density of at least 1.7 g/cm³.

The silicon is completely embedded inside the composite Si-carbon fiber.

An electrode for a battery includes a composite Si-carbon fiber comprising a carbon matrix material with 1-90 wt % silicon embedded therein.

The electrode can have a reversible energy storage capacity of 350 mAh/g to 4000 mAh/g. The electrode can have a reversible energy storage capacity of 350 mAh/g to 3500 mAh/g.

The electrode can further comprise a binder. The electrode can include a conductive additive. The electrode can include a current collector.

The fibers can be fused together in the absence of a binder. The fibers are fused together and in the absence of a current collector. The fibers can be provided with a binder and a conductive additive and coated onto a support. The support can be a current collector.

A battery according to the invention includes an electrode having composite Si-carbon fibers comprising a carbon matrix material with 1-90 wt % silicon embedded therein.

A method of making an electrode for a battery includes the step of providing carbon matrix material, and mixing silicon particles with the carbon matrix material to form a carbon-silicon mixture. Composite Si-carbon fibers are then formed from the carbon-silicon mixture wherein the silicon is embedded in the fibers. An electrode is formed incorporating the Si-carbon composite fibers into the electrode.

The composite Si-carbon fibers can be mixed with a binder to form the electrode. The Si-carbon fibers are mixed with carbon black to form the electrode. The Si-carbon fibers can be mixed with carbon black and a binder to form an electrode. The binder can be a polymeric binder. The binder can be Li—C. The Si-carbon fibers are fused together to form a mat, with or without a binder.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
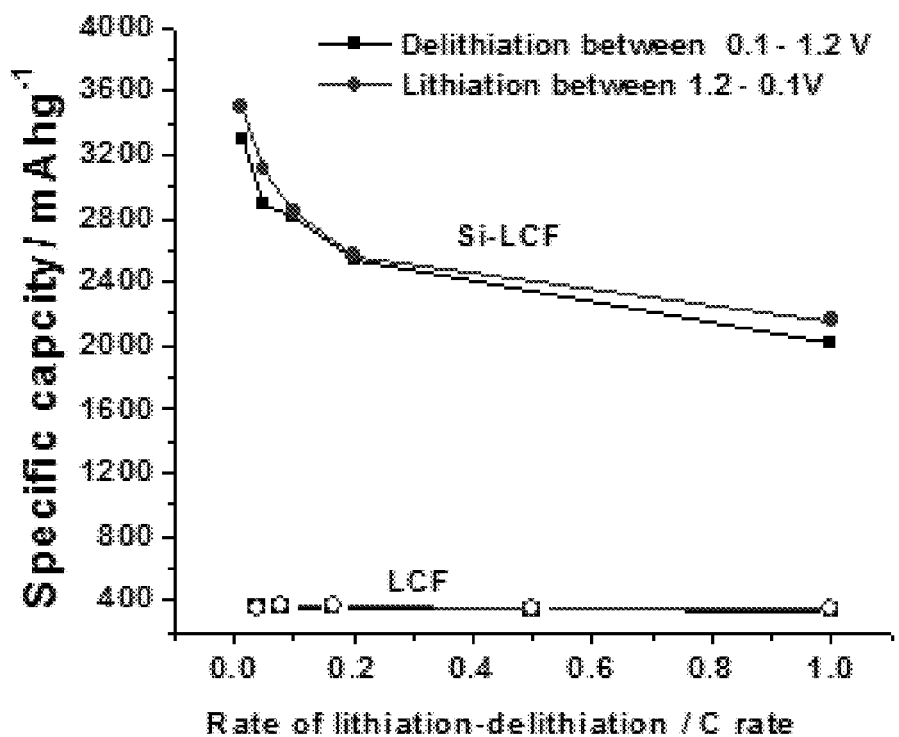
FIG. 1 is a plot of specific capacity (mAhg$^{-1}$) vs. rate of lithiation-delithiation (C rate) for a silicon (20 wt %) and lignin composite Si-carbon fiber, and for a lignin carbon fiber (LCF).

A composite Si-carbon fiber includes a carbon matrix material with 1-90 wt % silicon embedded therein. The composite Si-carbon fiber can have a wt % range of silicon that is any high value within this range and any low value within this range. The composite Si-carbon fiber can comprise 1-30 wt % silicon embedded therein, or a range of any high value and low value between 1% and 30%.

The composite Si-carbon fiber can have a diameter of 10-200 μm and a length of at least 3 times the diameter. The composite Si-carbon fiber can have a diameter of 50-100 μm and a length of at least 3 times the diameter.

The particle size of the silicon and can vary. The silicon can be crystalline with crystals of between 5 nm-200 μm in size. The silicon can be amorphous with particles of between 5 nm-200 μm in size. The silicon crystals or particles can have a size range with any low value and any high value within 5 nm-200 μm.

The carbon matrix material is the carbonaceous portion of the composite Si-carbon fiber. The carbon matrix material of the composite Si-carbon fiber is porous to lithium, which permits the composite carbon fiber to intercalate lithium within the fiber. The lithium enters the composite Si-carbon fiber by solid state diffusion through defects or grain boundaries that are in the carbon matrix material. Carbon fibers typically comprise sheets of graphene which are not amenable to the diffusion of lithium. The invention provides a carbon matrix material with sufficient grain boundaries and defects that lithium transport into and out of the composite carbon fibers is possible. The carbon matrix material can have a density of 2.0 g/cm$^3$ or less, which is indicative of defects or grain boundaries in the carbon matrix material through which lithium can be intercalated. The carbon matrix material can have a density of at least 1.7 g/cm$^3$.

The lithium which is intercalated into the composite Si-carbon fibers is transported to the Si particles that are embedded in the composite Si-carbon fibers. The swelling of the Si upon such intercalation does not damage the fiber as the Si particles are surrounded by the carbon matrix material. The defects and grain boundaries that provide the diffusion of lithium permit both lithiation and delithiation.

The carbon matrix material can be derived from any suitable carbon source. In one embodiment, the carbon matrix material is derived from lignin. In the case of a lignin derived carbon matrix material, defects or grain boundaries permitting the ingress and egress of lithium are created by the removal of aromatic side chains from the lignin. The carbon matrix material can be derived from an aromatic backbone polymer with a carbon char yield above 30 wt %. The carbon matrix material can be derived from polyacrylonitrile. In the case of non-lignin carbon matrix materials, the defects can be created by various chemical processes. It is also possible to utilize carbon matrix materials and to treat the carbon matrix materials to create suitable defects or grain boundaries for lithium transport. The amorphous carbon or low carbon density regions enable facile, isotropic lithium transport throughout the fiber structures, providing access to charge storage sites within the nanoscale graphitic domains while avoiding high specific surface areas associated with nanomaterials.

The silicon can be completely embedded inside the carbon fiber. The term "embedded" as used herein refers to the position of the silicon within the surface walls of the composite Si-carbon fibers. In one embodiment, substantially all of the volume of silica in the composite Si-carbon fiber is completely within the carbon matrix material, such that no silicon is present at the surface of the composite Si-carbon fibers. In another aspect, no more than 30%, 25%, 20%, 15%, 10%, 9%, 8%, 7%, 6%, 5%, 4%, 3%, 2%, and 1% of the surface area of the composite Si-carbon fiber is silicon, or a range of any high value and low value between 0% and 30%. All of the remainder of the surface area of the composite Si-carbon fiber can be the carbon matrix material. Surface silicon left exposed will in some cases be dissolved into the electrolyte such that little or no surface-exposed silicon will be present in the composite Si-carbon fibers. The silicon is uniformly distributed throughout the bulk of the composite Si-carbon fiber. The silicon at the surface can be proportional to the surface/volume ratio of the composite Si-carbon fiber. The reduced or eliminated silicon exposure to the electrolyte will greatly reduce or even eliminate problems experienced previously with silicon electrodes at the electrolyte interface.

An electrode for a battery includes composite Si-carbon fibers according to the invention processed by suitable methods to form electrodes. The electrodes so formed can have a reversible energy storage capacity of 350 mAh/g to 4000 mAh/g. The electrode can have a reversible energy storage capacity of 350 mAh/g to 3500 mAh/g.

The formation of the electrode can include binders to form the composite Si-carbon fibers into an electrode. Additional additives such as conductive additives can also be included. Such additives include conductive additives such as carbon black. The composite Si-carbon fiber/binder mixture can then be processed with or without such other additives.

The conductivity and mechanical properties of the electrodes can be such that a current collector is not necessary. The electrode can include a current collector of materials and construction that are known in the art. The fibers can be provided with a binder and a conductive additive and coated onto a support. The support can be a current collector, or a supportive structure that is not a current collector.

The fibers can be fused together in the absence of a binder. The fibers can be fused together and in the absence of a current collector. The composite Si-carbon fibers of the invention have good conductivity, chemical stability and mechanical stability.

A battery according to the invention includes an electrode having composite Si-carbon fibers comprising a carbon matrix material with 10-90 wt % silicon embedded therein. The battery can be of any suitable construction, including lithium ion, lithium air, and others.

Composite Si-carbon fibers according to the invention can be made from various processes. In one embodiment lignin is provided and mixed with silicon to provide a lignin/silicon mixture. The lignin/silicon mixture is then extruded into silicon/polymer matrix composite fibers. The composite fiber are thermally processed and converted into carbon fibers containing electrochemically active isolated Si particles. Any suitable extrusion or fiber-forming process can be utilized. In one embodiment, the extrusion process is a melt-spinning process. The fiber diameter and draw ratio are examples of adjustable parameters that control the architecture of bundles of individual fibers.

The processing of lignin into electrodes is described in prior pending application Ser. No. 13/567,275 filed Aug. 6, 2012 and entitled LIGNIN-BASED ACTIVE ANODE MATERIALS SYNTHESIZED FROM LOW COST RENEWABLE RESOURCES, the disclosure of which is hereby incorporated fully by reference.

The composite Si-carbon fibers are then formed into electrodes. Any suitable process for forming the electrodes can be utilized. The composite Si-carbon fibers can be mixed with a binder to form the electrode. The composite Si-carbon fiber and binder can be coated onto a support or a current collector. The composite Si-carbon fibers can be mixed with conductive additives such as carbon black and no binder, or with a binder, to form the electrode. The binder can be a polymeric binder. The binder can be Li—C. The composite Si-carbon fibers can be formed into a mat without any binder and fused together to form the mat. The composite Si-carbon fibers can be reacted with oxygen to raise the glass transition temperature to permit carbonization. The fibers are then carbonized in a manner which does not create SiC.

Thermal processing can define fiber morphology and electrode architecture as it can lead to partial melting of lignin at high energy surfaces. The resulting fiber-fiber fusion provides electrical interconnection throughout the entire electrode mass and electrode densification. These techniques are extended to Si-in-LCF, and electrode architecture. Preservation of rate capabilities is demonstrated through the controlled synthesis and electrochemical characterization of electrodes. Thorough electron microscopy of the Si/C interface and electrochemical characterizations it was determined that the interfacial resistance between the two phases is sufficient for good rate performance. Appreciable diffusion of C into the Si indicating the formation of the electrically inactive phase (SiC) was not detected.

The electrochemical performance of the cathodes comprising Si-LCF as the active mass was evaluated using two electrode coin-type cells with a 25 μm microporous trilayer membrane (polypropylene/polyethylene/polypropylene) separator. Electrodes were prepared with N-methylpyrrolidone (NMP), slurry of Si-LCF, polyvinylidene fluoride (PVDF), and carbon black (CB) in wt. % ratio of 83:13:4. The electrodes comprised ~2 mg of active Si-LCF per cm$^2$ on copper foil and were about 25 μm thick. Lithium foils (purity 99.9%, Alfa Aesar) were used as counter electrodes. The electrolyte solution was 1.2 M LiPF$_6$ in a 1:2 mixture of ethylene carbonate (EC) and dimethyl carbonate (DMC) by weight (battery grade, Novolyte Technologies, USA). Electrochemical cells were assembled in glove boxes (Innovative Technology, Inc., USA) filled with high purity argon. After assembling, the cells were stored at room temperature for about 12 h to ensure complete impregnation of the electrodes and separators with the electrolyte solution. Galvanostatic charge-discharge cycling was carried out using a multichannel battery tester (model 4000, Maccor Inc., USA) in two-electrode coin-type cells. The cells were charged-discharged galvanostatically at rates between C/75 to 1 C in the potential range between 0.11/0.1 V-1.2V. At any given C rate each cell is cycled at least 4 times except for C/75, C/20 and 1 C rates. The cells were discharged at a constant current with a cutoff potential at 0.11/0.1 V with a potentiostatic hold for 2 h at 0.11/0.1 V. It should be noted that electrochemical galvanostatic charge-discharge cycling was carried out even at lower cut off voltages of 50 mV and 5 mV. However cycling performance was poor at low cut off voltages. Galvanostatic charge-discharge cycling was carried out with at least on three 2-electrode coin cells to validate the reproducibility of the results.

FIG. 1 is a plot of specific capacity (mAhg$^{-1}$) vs. rate of lithiation-delithiation (C rate) for a silicon (20 wt %) and lignin composite Si-carbon fiber, and for a lignin carbon fiber (LCF). It can be seen that the electrodes made with composite Si-carbon fibers have significantly improved capacity relative to that of the lignin carbon fiber without silicon. The Si-carbon fiber has a very high capacity at low and medium discharge rates far above state of the art graphite. It can also be seen that the lignin carbon fiber has a capacity above state of the art graphite of less than 300 mAh/g.

Figure 2:
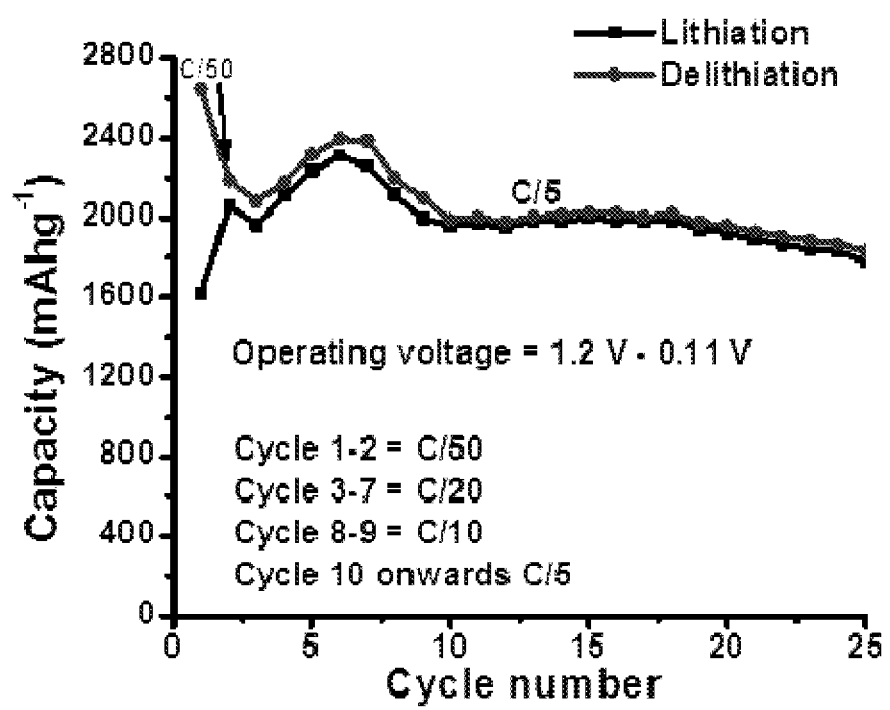
FIG. 2 is a plot of specific capacity (mAhg$^{-1}$) vs. cycle number at different C rates for Si electrodes having 83% Si-LCF composite Si-carbon fiber, 13% PVDF, and 4% carbon black, and where the composite Si-carbon fiber is 20 wt % silicon.

FIG. 2 is a plot of specific capacity (mAhg$^{-1}$) vs. cycle number at different C rates for Si electrodes having 83% composite Si-carbon fiber, 13% PVDF, and 4% carbon black, and where the composite Si-carbon fiber is 20 wt % silicon. It can be seen the Si particles retain galvanometric capacity at elevated rate electrochemical cycling, and that the material shows a good cyclability and maintains its high capacity.

Figure 3:
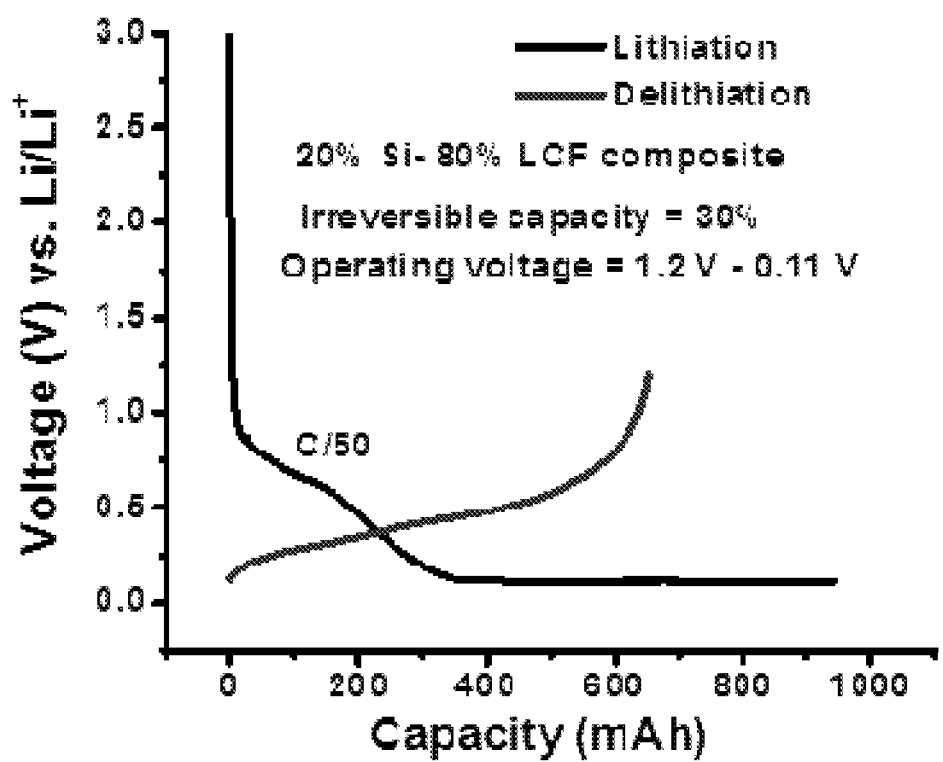
FIG. 3 is a plot of voltage (V) vs. Li/Li$^+$ vs. Capacity (mAh).

FIG. 3 is a plot of voltage (V) vs. Li/Li$^+$ vs. Capacity (mAh). It can be seen that the 1$^{st}$ and subsequent discharge curves are similar. It can also be seen that there is a minimal voltage hysteresis between the charge and discharge cycles. The first cycle efficiency loss is on an adequate level consistent with state of the art materials.

Figure 4:
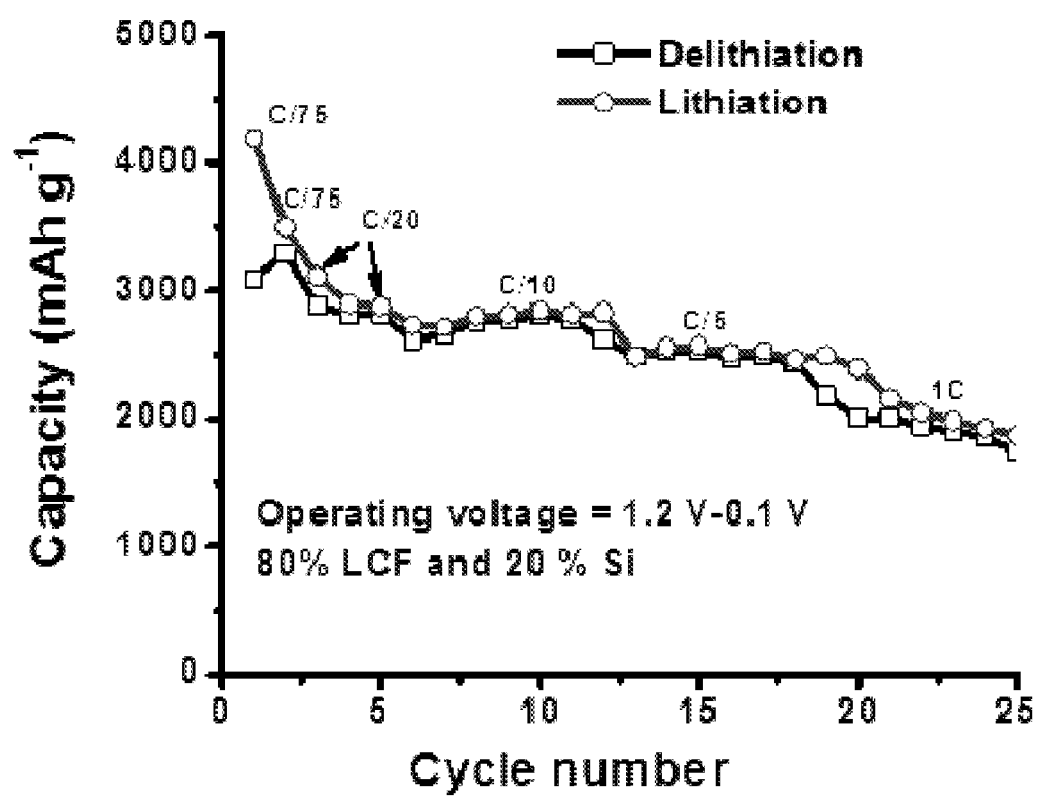
FIG. 4 is a plot of specific capacity (mAhg$^{-1}$) vs. cycle number for lithiation and delithiation at differing C-rates for a silicon (20 wt %) and lignin composite Si-carbon fiber.

FIG. 4 is a plot of specific capacity (mAhg$^{-1}$) vs. cycle number for lithiation and delithiation at differing C-rates for a silicon (20 wt %) and lignin composite Si-carbon fiber. It can be seen that rate capability and specific capacity of the material for rates between C/75 and 1 C is very high.

Figure 5:
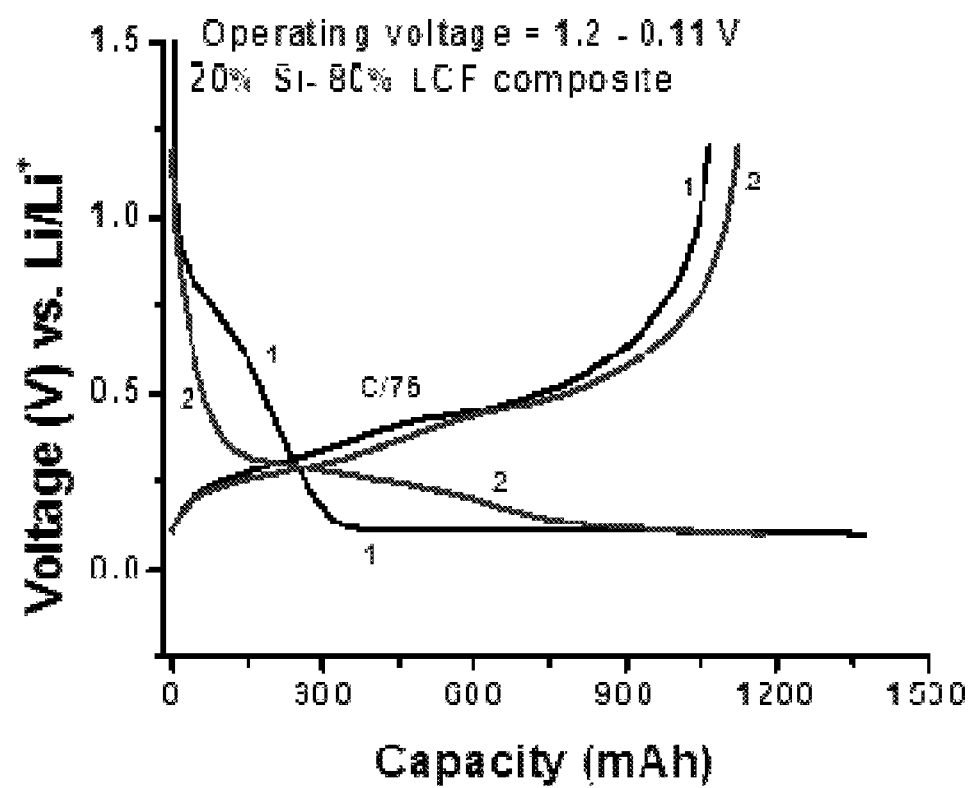
FIG. 5 is a plot of voltage (V) vs. Li/Li$^+$ vs. Capacity (mAh) with the LCF capacity subtracted during Si capacity evaluation.

FIG. 5 is a plot of voltage (V) vs. Li/Li$^+$ vs. Capacity (mAh) with the LCF capacity subtracted during Si capacity evaluation. It can be seen that a considerable amount of Si material is participating in the electrochemical reaction and the material has a high capacity.

Figure 6:
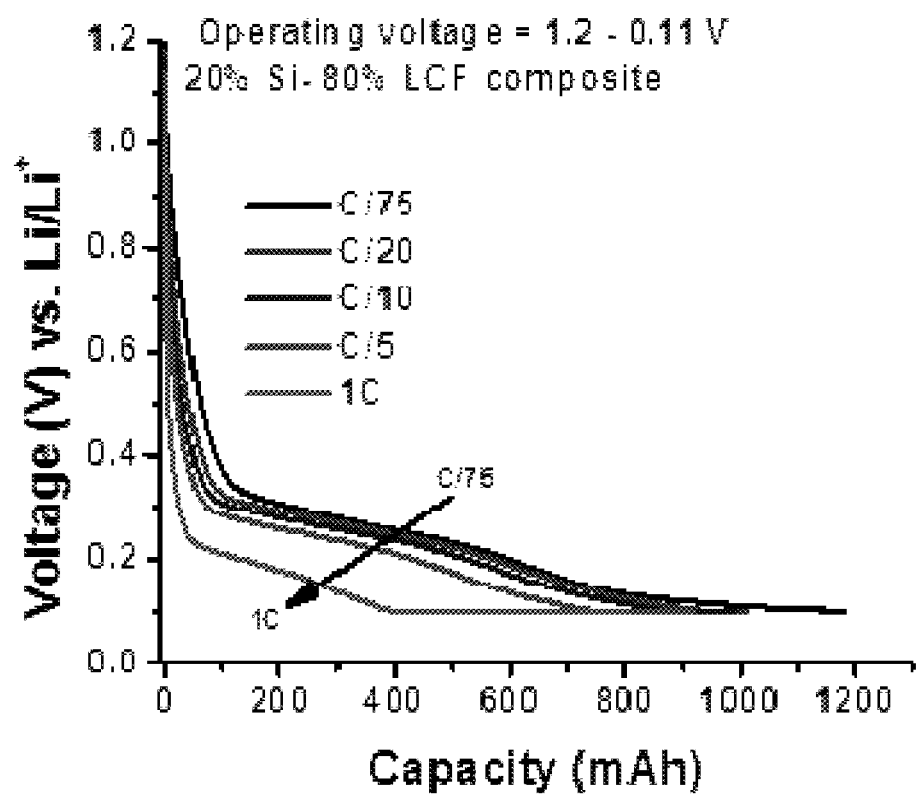
FIG. 6 is a plot of voltage (V) vs. Li/Li$^+$ vs. Capacity (mAh) for both LCF and Si composite capacity.

FIG. 6 is a plot of voltage (V) vs. Li/Li$^+$ vs. Capacity (mAh) for both LCF and Si composite capacity. It can be seen that the voltage drop at higher rates is low and resistivity/polarization is adequate.

Figure 7:
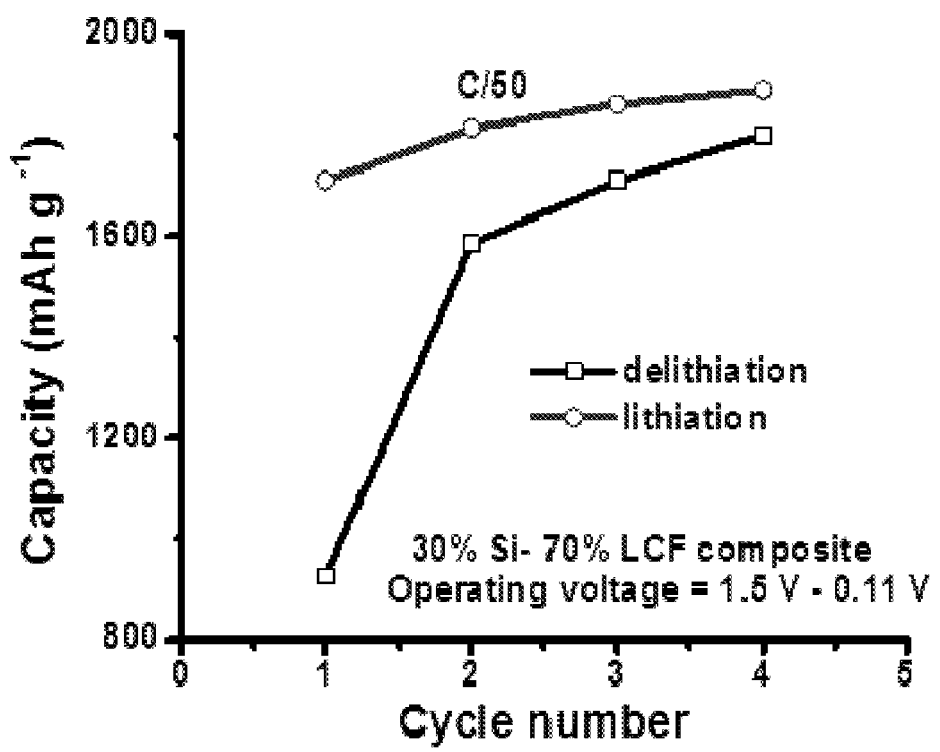
FIG. 7 is a plot of specific capacity (mAhg$^{-1}$) vs. cycle number at C/50 rates for Si electrodes having 83% composite Si-carbon fiber, 13% PVDF, and 4% carbon black, and where the composite Si-carbon fiber is 30 wt % silicon.

FIG. 7 is a plot of specific capacity (mAhg$^{-1}$) vs. cycle number at C/50 rates for Si electrodes having 83% Si-LCF composite Si-carbon fiber, 13% PVDF, and 4% carbon black, and where the Si-LCF composite carbon fiber is 30 wt % silicon. It can be seen that the capacity of the material increases to fully develop its initial capacity.

Figure 8:
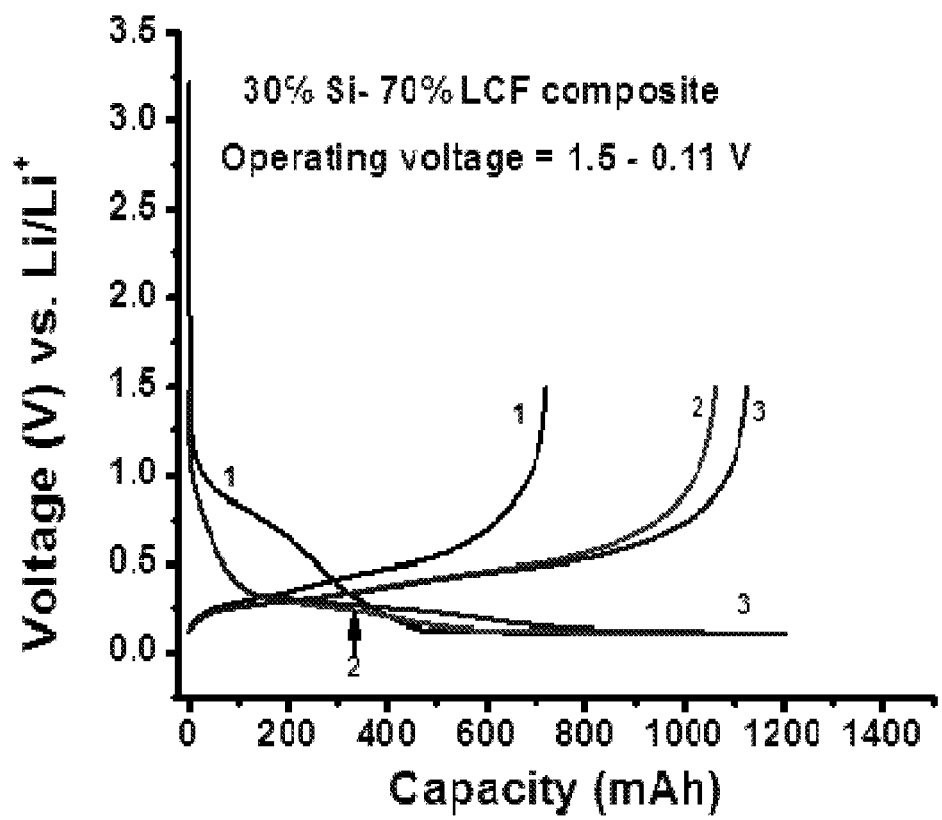
FIG. 8 is a plot of voltage (V) vs. Li/Li$^+$ vs. Capacity (mAh) for both LCF and Si composite capacity for the electrode having 30 wt % Si composite Si-LCF carbon fibers, with both LCF and Si composite capacity.

FIG. 8 is a plot of voltage (V) vs. Li/Li$^+$ vs. Capacity (mAh) for both LCF and Si composite capacity for the electrode having 30 wt % Si composite Si-LCF carbon fibers, with both LCF and Si composite capacity. It can be seen that the capacity of the material increases to fully develop its initial capacity.

Figure 9:
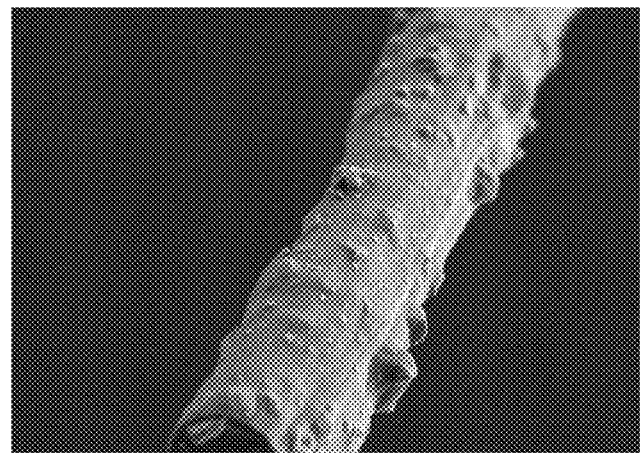
FIG. 9 is a scanning electron microscopy (SEM) image and a back scattered electron (BSE) image of a section of a composite Si-carbon fiber having 10 wt % silicon.
Figure 9:
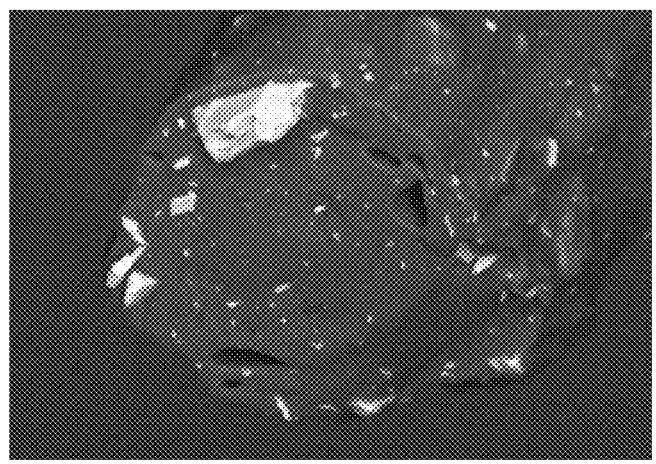

FIG. 9 is a scanning electron microscopy (SEM) image and a back scattered electron (BSE) image of a section of a composite Si-carbon fiber having 10 wt % silicon. It can be seen that the silicon particles are fully embedded in the carbon fiber and have a strong interface with the carbon fiber without exposing silicon surface to the outside of the fiber or environment.

Figure 10:
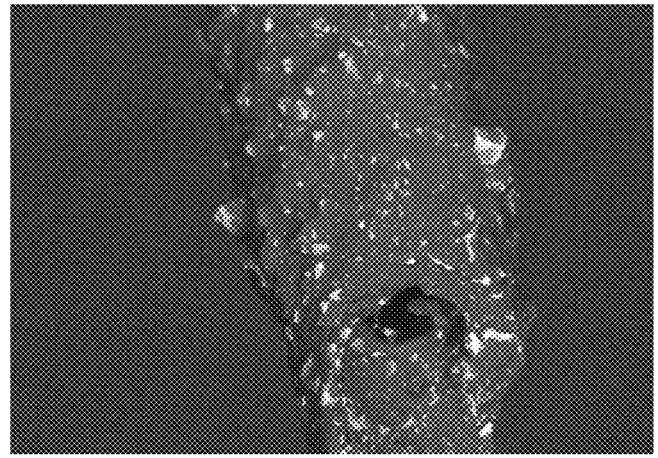
FIG. 10 is a scanning electron microscopy (SEM) image and a back scattered electron (BSE) image of a section of a composite Si-carbon fiber having 20 wt % silicon.
Figure 10:
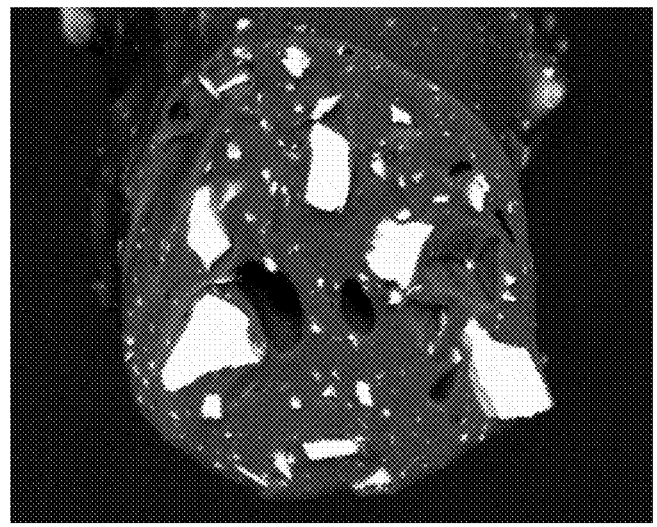

FIG. 10 is a scanning electron microscopy (SEM) image and a back scattered electron (BSE) image of a section of a composite Si-carbon fiber having 20 wt % silicon. It can be seen that the silicon particles are fully embedded in the carbon fiber and have a strong interface with the carbon fiber without exposing silicon surface to the outside of the fiber or environment.

Figure 11:
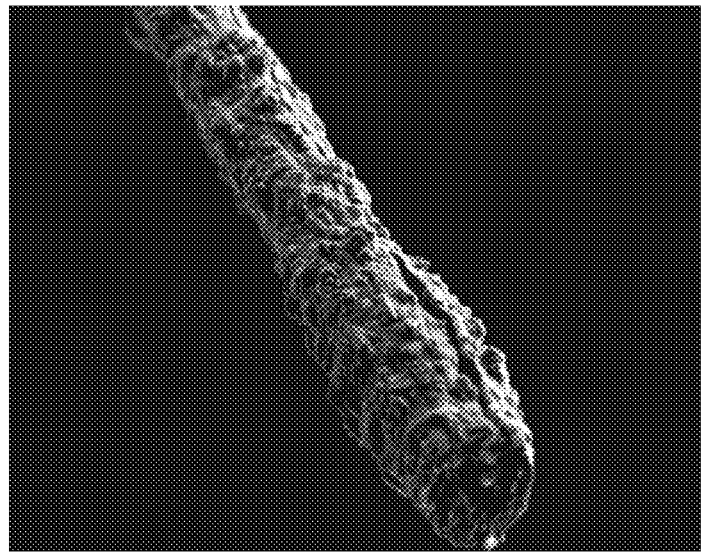
FIG. 11 is a scanning electron microscopy (SEM) image and a back scattered electron (BSE) image of a section of a composite Si-carbon fiber having 30 wt % silicon.
Figure 11:
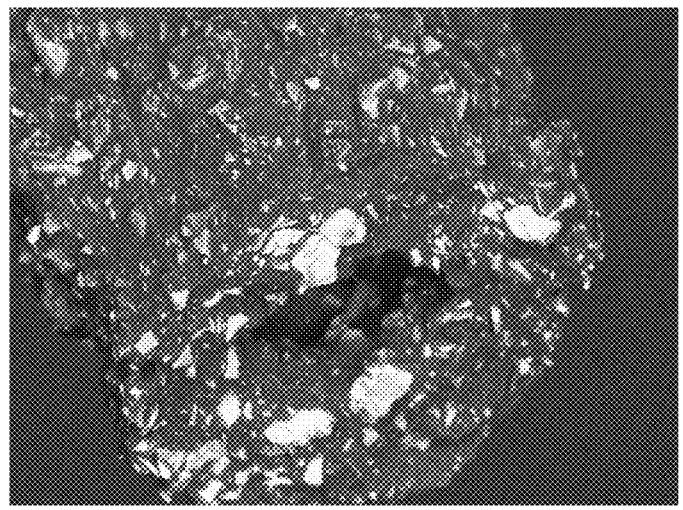

FIG. 11 is a scanning electron microscopy (SEM) image and a back scattered electron (BSE) image of a section of a composite Si-carbon fiber having 30 wt % silicon. It can be seen that the silicon particles are fully embedded in the carbon fiber and have a strong interface with the carbon fiber without exposing silicon surface to the outside of the fiber or environment.

Figure 12:
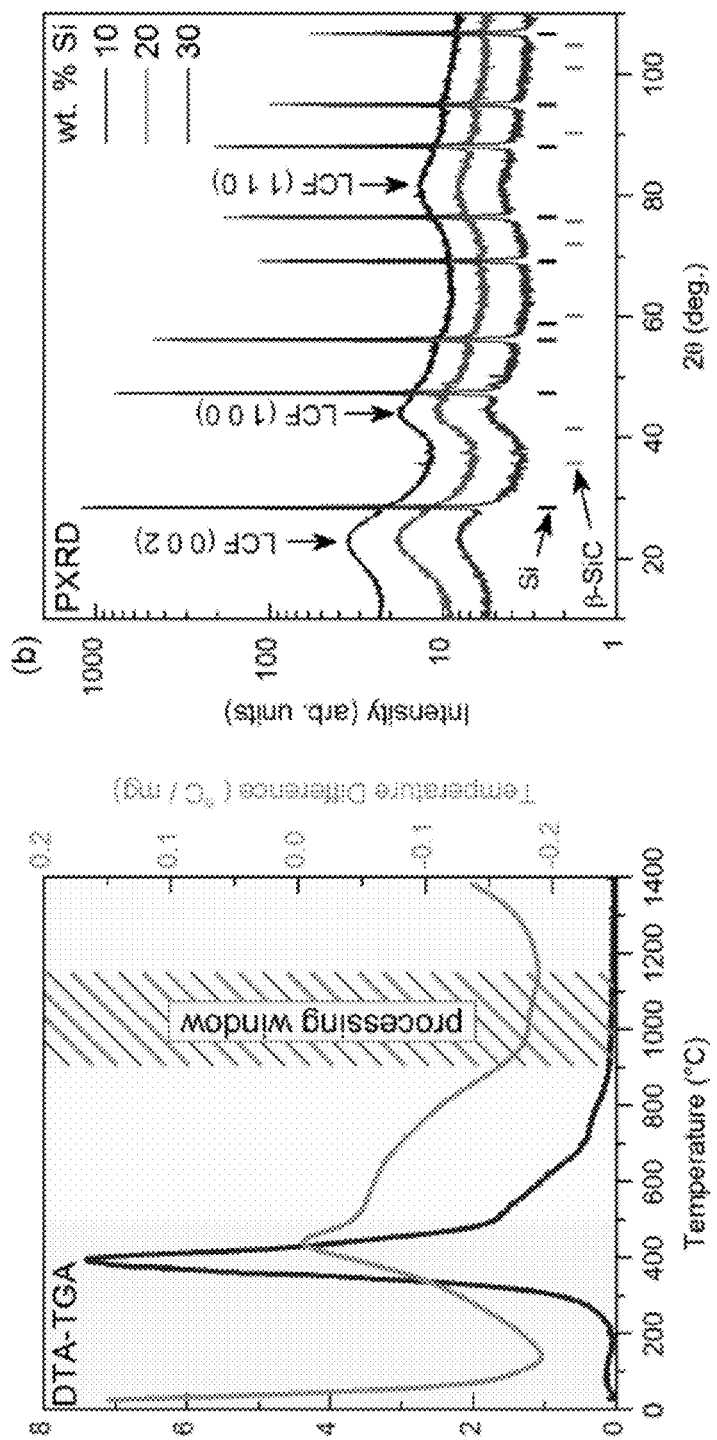
FIG. 12 is a plot of (a) derivative weight (%/min) and temperature difference (° C./mg) vs temperature (° C.) and (b) intensity (arb. units) vs 2θ (deg.)

FIG. 12 is a plot of (a) derivative weight (%/min) and temperature difference (° C./mg) vs temperature (° C.) and (b) intensity (arb. units) vs 2θ (deg.) It can be seen that the process window is chosen to fully volatilize any volatile materials and no additional material is being removed. The X-ray diffraction shows the crystal structure of the material. It can be seen that the silicon is crystalline and the lignin carbon fiber has its typical defect structure. It can also be confirmed that no silicon carbide or other phases are present.

Example. Si particles were incorporated into the raw lignin to yield composite Si-carbon fibers consisting of isolated Si particles within a semicontinuous pseudo-graphitic structure. The carbon surfaces of the LCF carbon matrix material will primarily define the SEI, minimizing complications of Si SEI chemistry. Lignin is typically extracted as a complex mix of macromolecules that form a thermoplastic solid at room temperature. This material was ground to a powder and mechanically blended with Si powder consisting of coarse R<=22 µm particles to yield a mass fraction of 10, 20 or 30 wt. % Si, balance carbon from lignin. Solvent extracted hardwood lignin was selected for this application because it melts at modest temperatures (slightly above 100° C.) and is stable in air at temperatures above the Tg (glass transition temperature) for several hours. These characteristics enable melt processing of the mixture into a fibrous morphology biopolymer composite while employing only low cost technologies.

The composite fiber is thermally converted into a mesostructural carbon structure containing the majority of the Si particles embedded within. Scanning electron microscopy (SEM) secondary electrons images (SE) that highlight fiber topography and back scattered electron images (BSE) that highlight the contrast between the Si particles and carbon matrix for the each of the 3 mass fractions are shown in FIGS. 9-11, where the top figures are SEM images and the bottom figures are BSE images. In general the average fiber diameter progressively increased (from 30 µm to over 60 µm) with the fraction of Si particles along with increased in surface roughness. This was attributed to modifications of rheological properties by addition of non-reacting solid particles that lead to an increased resistance to melt flow. It was not possible to continuously spin fibers containing more than 30 wt. % Si using this technique.

Conversion of the biopolymer into a pseudo-graphitic structure is accomplished by oxidative stabilization followed by pyrolysis in a sweeping inert atmosphere such as flowing nitrogen. In order to minimize and/or prevent the formation of SiC yet still convert the oxidized biopolymer a transient thermal profile was selected and used the lowest heat-treatment temperature possible based on Differential Thermal Analysis (DTA) and Thermal Galvanometric Analysis (TGA). A select thermal scan at 10° C./min from ambient to 1400° C. in a nitrogen environment, shown in FIG. 12a, reveals a wide exothermic peak linked to a decrease in mass. TGA clearly shows 3 distinct regions of pyrolysis which is expected from the complex mixture of various molecular weight molecules found in lignin. Differential Scanning calorimetry (DSC) data also indicated a convolution of at least 3 exothermic peaks. The pyrolysis is complete when the majority of volatiles, oxygen and hydrogen have been driven off as indicated by a flat region in the DTA curve and cessation of mass loss in TGA. This occurs at approximately 900° C. and extends to approximately 1200° C. where indication of exothermic reactions possibly between Si and C becomes significant. Based on these results 1000° C. was selected as a maximum pyrolysis temperature for this application. BSE images shown in FIGS. 9-11 of the composite Si-carbon fiber cross-section reveal a sharp interface between the isolated Si particles and carbon matrix with no discernible micro-scale porosity. This indicates that in all cases there was no long range diffusion of the C into the Si or formation of a microscale layer of SiC. In addition, no evidence of SiC formation was observed in powder x-ray diffraction measurements (FIG. 12b). The patterns show the expected broad features corresponding to the LCF and sharp reflections from the embedded Si powder. No size or strain induced broadening of the Si reflections can be resolved.

The diffraction profiles in FIG. 12b suggests the matrix material is similar to LCF anode material produced by this same process without secondary particles included. This was shown to have an internally modulated mesostructure consisting of high-density, nanoscale crystalline (graphitic) domains surrounded by a continuous, low-density, highly disordered carbon matrix. Thus, the amorphous carbon network in the present materials should enable similarly facile, isotropic lithium transport throughout the composite Si-carbon fiber structures, providing access to charge storage sites within the silicon particles and nanoscale graphitic domains, while supporting the stability of the Si material via encapsulation in carbon, and avoiding high specific surface areas associated with nanomaterials.

The pseudo-graphitic nanostructure of the characterize lignin carbon fiber as an intercalation material assures the Si particles are always in compression preventing intercalation induced stresses from causing fracture and electrical isolation of the high capacity active material. This mechanism is thought to enable the observed electrochemical stability in the large embedded Si particles (greater the 20 micron) that otherwise would not cycle reversibly when directly coated onto a typical electrode. Most of the Si particles are never in direct contact with the electrolyte and this effectively circumvents the chemically unstable interface altogether. Alternatively the high capacity particles receive Li via solid state diffusion through the pseudo-graphitic phase. The SEI is between the electrolyte/carbon and not between the electrolyte/Si effectively solving the unstable SEI problem.

The invention provides a next-generation architecture for lithium batteries that can potentially circumvent requirements for polymeric binders, conductive aids, and current collectors using low cost, industrially scalable materials and process technologies. Electrodes that are several hundreds of micrometers thick but maintain rate capabilities will reduce volume contributions of electrolyte, separator, and tabs. Rate capabilities are maintained by synthesizing three-dimensional monolithic electrode architectures composed of lignin- The invention can be embodied in other forms without departing from the spirit or essential attributes there. Accordingly, reference should be made to the following claims to determine the scope of the invention.

We claim:

1. An electrode for a battery, comprising a composite Si-carbon fiber having an outer surface with a surface area, the fiber comprising a carbon matrix material with 1-90 wt % silicon particles embedded therein, said particles comprising a surface layer of silica, the particles being embedded within the fibers with less than 10% of the surface area of the outer surface of the fiber being exposed silicon particles.

2. The electrode of claim 1, comprising 1-30 wt % silicon embedded therein.

3. The electrode of claim 1, wherein the composite Si-carbon fiber has a diameter of 10-200 μm and a length of at least 3 times the diameter.

4. The electrode of claim 1, wherein the composite Si-carbon fiber has a diameter of 50-100 μm and a length of at least 3 times the diameter.

5. The electrode of claim 1, wherein the silicon is crystalline with crystals of between 5 nm-200 μm in size.

6. The electrode of claim 1, wherein the silicon is amorphous with particles of between 5 nm-200 μm in size.

7. The electrode of claim 1, wherein the carbon matrix material is derived from lignin.

8. The electrode of claim 1, wherein the carbon matrix material comprises an aromatic backbone polymer with a carbon char yield above 30 wt %.

9. The electrode of claim 1, wherein the carbon matrix material is derived from polyacrylonitrile.

10. The electrode of claim 1, wherein the carbon matrix material has a density of 2.0 g/cm3 or less.

11. The electrode of claim 1, wherein the carbon matrix material has a density of at least 1.7 g/cm3.

12. The electrode of claim 1, wherein the silicon is completely embedded inside the composite Si-carbon fiber.

13. The electrode of claim 1, wherein the electrode has a reversible energy storage capacity of 350 mAh/g to 4000 mAh/g.

14. The electrode of claim 1, wherein the silicon is uniformly distributed throughout the bulk of the composite Si-carbon fiber.

15. The electrode of claim 1, wherein the electrode has a reversible energy storage capacity of 350 mAh/g to 3500 mAh/g.

16. The electrode of claim 1, further comprising a binder.

17. The electrode of claim 1, further comprising a conductive additive.

18. The electrode of claim 1, further comprising a current collector.

19. The electrode of claim 1, wherein the fibers are fused together in the absence of a binder.

20. The electrode of claim 1, wherein the fibers are fused together and in the absence of a current collector.

21. The electrode of claim 1, wherein the composite Si-carbon fibers are provided with a binder and a conductive additive and coated onto a support.

22. The electrode of claim 21, wherein the support is a current collector.

23. A battery comprising an electrode, the electrode comprising composite Si-carbon fibers having an outer surface with a surface area, the fibers comprising a carbon matrix material with 1-90 wt % silicon particles embedded therein, said particles comprising a surface layer of silica, the particles being embedded within the fibers with less than 10% of the surface area of the outer surface of the fiber being exposed silicon particles.

24. The electrode of claim 1, wherein no more than 5% of the surface area of the outer surface of the fiber is exposed silicon particles.

25. The electrode of claim 1, wherein no more than 1% of the surface area of the outer surface of the fiber is exposed silicon particles.

26. The electrode of claim 1, wherein the silicon particles are completely embedded inside the carbon fiber.

* * * * *